US012735656B2

(12) United States Patent
Chen et al.

(10) Patent No.: US 12,735,656 B2
(45) Date of Patent: Sep. 15, 2026

(54) BIOSURFACTANT BASED MICELLAR CLEANSING COMPOSITION

(71) Applicant: L'OREAL, Paris (FR)

(72) Inventors: Changlong Chen, Edison, NJ (US); Mariko Hasebe, New York, NY (US)

(73) Assignee: L'OREAL, Paris (FR)

( * ) Notice: Subject to any disclaimer, the term of this patent is extended or adjusted under 35 U.S.C. 154(b) by 222 days.

(21) Appl. No.: 18/759,096

(22) Filed: Jun. 28, 2024

(65) Prior Publication Data

US 2026/0002092 A1 Jan. 1, 2026

(51) Int. Cl.

| | |
|---|---|
| ***C11D 1/72*** | (2006.01) |
| ***C11D 1/00*** | (2006.01) |
| ***C11D 1/20*** | (2006.01) |
| ***C11D 1/66*** | (2006.01) |
| ***C11D 1/825*** | (2006.01) |
| ***C11D 3/00*** | (2006.01) |
| ***C11D 3/20*** | (2006.01) |
| ***C11D 3/22*** | (2006.01) |
| ***C11D 3/30*** | (2006.01) |
| ***C11D 3/43*** | (2006.01) |
| ***C11D 3/44*** | (2006.01) |

(52) U.S. Cl.

CPC ................ *C11D 1/667* (2013.01); *C11D 1/00* (2013.01); *C11D 1/20* (2013.01); *C11D 1/72* (2013.01); *C11D 1/825* (2013.01); *C11D 3/0047* (2013.01); *C11D 3/2041* (2013.01); *C11D 3/2065* (2013.01); *C11D 3/2075* (2013.01); *C11D 3/2079* (2013.01); *C11D 3/2082* (2013.01); *C11D 3/22* (2013.01); *C11D 3/30* (2013.01); *C11D 3/43* (2013.01)

(58) Field of Classification Search

CPC .... C11D 1/00; C11D 1/20; C11D 1/72; C11D 3/2065; C11D 3/2041; C11D 3/2082; C11D 3/22; C11D 3/2075; C11D 3/2079

USPC ....... 510/119, 130, 136, 137, 138, 158, 159, 510/500, 505, 506

See application file for complete search history.

(56) References Cited

U.S. PATENT DOCUMENTS 6,596,265 B1 * 7/2003 Borzeix Concaix ... A61K 8/365 424/401
2023/0414479 A1 * 12/2023 Cavaco Paulo .......... A61K 8/64

FOREIGN PATENT DOCUMENTS

CN 110151606 B * 4/2022 ............. A61K 8/922
TW 202408457 A * 3/2024 ............... A61Q 5/12

OTHER PUBLICATIONS

Anonymous, Mintel, "Makeup Remover + Cleansing Water," Record ID 9666882, Jun. 2022, www.gnpd.com.
Anonymous, Mintel, "Makeup Remover + Cleansing Water," Record ID 9576606, May 2022, www.gnpd.com.
Anonymous, Mintel, "Conditioner," Record ID 8693759, May 2021, www.gnpd.com.
Anonymous, Mintel, "Treatment," Record ID 8693761, May 2021, www.gnpd.com.
Anonymous, Mintel, "Deep Clean & Renew Shampoo," Record ID 8604787, Apr. 2021, www.gnpd.com.
Anonymous, Mintel, "Treatment Cleansing Milk," Record ID 9137400, Nov. 2021, www.gnpd.com.
Anonymous, Mintel, "Makeup Remover," Record ID 8478761, Feb. 2021, www.gnpd.com.
Anonymous, Mintel, "Skincare Cleansing Milk Cleansing," Record ID 8261447, Nov. 2020, www.gnpd.com.
Anonymous, Mintel, "Treatment Cleansing Milk," Record ID 7140635, Dec. 2019, www.gnpd.com.
Anonymous, Mintel, "Skincare Cleansing," Record ID 5326645, Dec. 2017, www.gnpd.com.
Anonymous, Mintel, "Air Cushion Natural SPF 50+ PA+++," Record ID 4798683, May 2017, www.gnpd.com.
Anonymous, Mintel, "Air Cushion Cover SPF 50+ PA+++," Record ID 4798685, May 2017, www.gnpd.com.
Anonymous, Mintel, "Treatment Cleansing Cream," Record ID 3124177, Apr. 2015, www.gnpd.com.
Anonymous, Mintel, "Treatment Cleansing Milk," Record ID 1513753, Jul. 2009, www.gnpd.com.
Anonymous, Mintel, "Mascara," Record ID 675863, Apr. 2007, www.gnpd.com.

* cited by examiner

*Primary Examiner* — Gregory R Delcotto
(74) *Attorney, Agent, or Firm* — McNees Wallace & Nurick LLC

(57) ABSTRACT

A monophasic micellar water cleansing composition includes a combination of surfactants that include at least one biosurfactant and at least one polyglycerol ester surfactant, in particular, one of polyglycerol-3 and polyglycerol-4 ester surfactants, wherein the combination of surfactants provides a water rinsible composition that is visually clear and pleasing on application with high makeup removability. More particularly, the composition provides highly effective makeup removal exceeding the performance of at least one commercial benchmark having components that are considered effective but less desirable due to the presence of ingredients that are harsh and less natural. The micellar cleansing composition has a pH in a range from about 4 to about 8, and may be essentially free or free of PEG/POE surfactants.

20 Claims, No Drawings

BIOSURFACTANT BASED MICELLAR CLEANSING COMPOSITION

FIELD OF THE INVENTION

The present disclosure is directed to a skin care composition, in particular, a biosurfactant and polyglycerol ester surfactant based micellar cleansing composition in a micellar formulation.

BACKGROUND OF THE INVENTION

Monophase micellar water as a gentle makeup remover is popular among consumers as it provides hydration and a refreshing sensation after use. The challenge of monophase micellar water is a relatively low removing efficiency of makeup, including foundation and mascara, particularly longwear makeup as compared with oil based makeup removers. There is thus a challenge to provide an aesthetically pleasing micellar cleansing composition that provides robust efficacy. Products with alternate cleansing components, including polyethylene glycol surfactants provide an alternative to oil based removers but can prove harsh to the skin.

The inventors have formulated an innovative technology that overcomes the shortcomings of the prior art to improve the performance of micellar water cleanser by incorporating biosurfactant, for example, but not limited to, rhamnolipid, sophorolipid, spiculisporic acid, sodium surfactin, together with at least one polyglycerol ester surfactant. Employing these ingredients, the micellar cleansing composition lacks ingredients that are harsh or otherwise undesirable or unsustainable and provides demonstrably improved efficacy as compared with less natural or harsher compositions. The micellar cleansing composition is transparent and maintains on application a transparent appearance of micellar water with a refreshing sensation after use and provides enhanced removal efficacy and hydration as compared with current product solutions. In some embodiments, the inventive composition is free of polyethylene glycol/polyethylene oxide (PEG/POE) surfactants.

BRIEF SUMMARY OF THE INVENTION

In various embodiments, the disclosure provides a monophasic micellar cleansing composition comprising at least one biosurfactant present in an amount that at least about 0.1%, by weight, based on the weight of the micellar cleansing composition; at least one polyglycerol ester surfactant present in an amount that is at least about 0.1%, by weight, based on the weight of the micellar cleansing composition; and an aqueous carrier comprising at least water, wherein the micellar cleansing composition has a pH in a range from about 5 to about 8.

In some embodiments, the micellar cleansing composition is essentially free of one or more ingredients selected from the group consisting of cationic polymers, PEG/POE surfactants, fragrance and oil, and combinations thereof.

In some embodiments, the at least one biosurfactant is selected from the group consisting of rhamnolipid, sophorolipid, spiculisporic acid, sodium surfactin, and combinations thereof.

In some embodiments, the at least one biosurfactant is selected from the group consisting of rhamnolipid, sophorolipid, spiculisporic acid, sodium surfactin, wherein if the biosurfactant is a sophorolipid the micellar cleansing composition has a pH that is at least 5, and if the biosurfactant is a rhamnolipid or spiculisporic acid the micellar cleansing composition has a pH that is at least 5.5, and if the biosurfactant is sodium surfactin the micellar cleansing composition has a pH that is at least 7.5.

In some embodiments, the at least one polyglycerol ester surfactant selected from the group consisting of at least one polyglycerol-3 ester surfactant and at least one polyglycerol-4 ester surfactant.

In some embodiments, the at least one polyglycerol ester surfactant selected from the group consisting of polyglyceryl-3 caprate, polyglyceryl-3 caprylate/caprate, polyglyceryl-3 laurate, polyglyceryl-4 caprate, polyglyceryl-4 laurate, polyglyceryl-4 caprylate/caprate, and combinations thereof.

In some embodiments, the micellar cleansing composition expressly excludes any polyglycerol ester surfactants selected from the group consisting of Polyglyceryl-6/Polyglyceryl-4 Caprylate, Polyglyceryl-3 Caprylate, Polyglyceryl-3/Polyglyceryl-4 Caprylate, Polyglyceryl-6 Caprylate/Ricinoleate, Polyglyceryl-5 Laurate, Polyglyceryl-2 Laurate, Polyglyceryl-6 Dicaprate, Polyglyceryl-6 Caprylate, and combinations thereof.

In some embodiments, the micellar cleansing composition the micellar cleansing composition expressly excludes surfactants and emulsifiers other than polyglycerol-3 ester surfactants and polyglycerol-4 ester surfactants, and oils other than oil based actives such as tocopherol.

In some embodiments, the at least one biosurfactant is present from at least about 0.1% to about 20%, by weight, based on the weight of the micellar cleansing composition.

In some embodiments, the at least one biosurfactant is present from at least about 0.1% to about 4%, by weight, based on the weight of the micellar cleansing composition.

In some embodiments, the at least one biosurfactant is present in the micellar cleansing composition at about 0.5% by weight, based on the weight of the micellar cleansing composition.

In some embodiments, the at least one polyglycerol ester surfactant is in the micellar cleansing composition from at least about 0.1% to about 5%, by weight, based on the weight of the micellar cleansing composition.

In some embodiments, the at least one polyglycerol ester surfactant includes one of polyglyceryl-3 caprylate/caprate or polyglyceryl-4 caprate present in the micellar cleansing composition from about 0.1% to about 0.8%, by weight, based on the weight of the micellar cleansing composition.

In some embodiments, the at least one polyglycerol ester surfactant includes one of polyglyceryl-3 caprylate/caprate or polyglyceryl-4 caprate present in the micellar cleansing composition at about 0.5%, by weight, based on the weight of the micellar cleansing composition.

In some embodiments, water is present from about 85% to about 95%, by weight, based on the weight of the micellar cleansing composition.

In some embodiments, the micellar cleansing composition comprises at least one water based solvent selected from the group consisting of hexylene glycol, glycerin, pentylene glycol, propanediol, ethanol, propanol, butanol, isopropanol, isobutanol, benzyl alcohol, phenylethyl alcohol, and combinations thereof.

In some embodiments, the disclosure provides a micellar cleansing composition comprising at least one biosurfactant present from at least about 0.1% to about 4% and selected from the group consisting of rhamnolipid, sophorolipid, spiculisporic acid, sodium surfactin, and combinations thereof, at least one polyglycerol ester surfactant present from at least about 0.1% to about 5% and selected from the group consisting of at least one polyglycerol-3 ester surfactant and at least one polyglycerol-4 ester surfactant, water present from about 85% to about 95%, at least one water based solvent comprising hexylene glycol, glycerin or a combination thereof, each present from about 0.5% to about 5%, all amounts by weight, based on the weight of the micellar cleansing composition.

In some embodiments, the micellar cleansing composition expressly excludes surfactants other than the at least one polyglycerol-3 ester surfactant and the at least one polyglycerol-4 ester surfactant, emulsifiers, and oils other than oil based actives such as the vitamin tocopherol.

In some embodiments, the at least one biosurfactant is selected from the group consisting of rhamnolipid, sophorolipid, spiculisporic acid, sodium surfactin, wherein if the biosurfactant is a sophorolipid the micellar cleansing composition has a pH that is at least 5, and if the biosurfactant is a rhamnolipid or spiculisporic acid the micellar cleansing composition has a pH that is at least 5.5, and if the biosurfactant is sodium surfactin the micellar cleansing composition has a pH that is at least 7.5.

In some embodiments, the disclosure provides a micellar cleansing composition comprising at least one biosurfactant present at about 0.5% and selected from the group consisting of rhamnolipid, sophorolipid, spiculisporic acid, sodium surfactin, and combinations thereof, at least one polyglycerol ester surfactant present at about 0.5% and selected from the group consisting of at least one polyglycerol-3 ester surfactant and at least one polyglycerol-4 ester surfactant, water present at about 95%, at least one water based solvent comprising hexylene glycol, glycerin or a combination thereof, each present from about 1% to about 2%, all amounts by weight, based on the weight of the micellar cleansing composition, wherein the at least one biosurfactant is selected from the group consisting of rhamnolipid, sophorolipid, spiculisporic acid, sodium surfactin, wherein if the biosurfactant is a sophorolipid the micellar cleansing composition has a pH that is at least 5, and if the biosurfactant is a rhamnolipid or spiculisporic acid the micellar cleansing composition has a pH that is at least 5.5, and if the biosurfactant is sodium surfactin the micellar cleansing composition has a pH that is at least 7.5.

According to some embodiments, the micellar cleansing composition has a pH in a range from about 5 to about 8, and in some embodiments, has a pH that is at least pH 5, or pH 5.5, or pH 7.5.

According to some embodiments, the micellar cleansing composition is essentially free of one or more ingredients selected from the group consisting of cationic polymers, PEG/POE surfactants, and combinations thereof.

It is to be understood that both the foregoing general description and the following detailed description are exemplary and explanatory only and are not restrictive of the invention.

DETAILED DESCRIPTION OF THE INVENTION

In the various embodiments, the micellar cleansing composition is a micellar water essentially lacking an oil phase. In some embodiments, the micellar cleansing composition is a skin cleanser, shampoo, or body wash and in some particular embodiments, the micellar cleansing composition is a facial cleanser and/or makeup remover.

The inventors have provided a monophasic micellar cleansing composition having a combination of surfactants that include at least one biosurfactant and at least one polyglycerol ester surfactant, in particular, one of polyglycerol-3 and polyglycerol-4 ester surfactants, wherein the combination of surfactants provides a water rinsible composition that is visually clear and pleasing on application with high makeup removability. More particularly, the composition provides highly effective makeup removal exceeding the performance of at least one commercial benchmark having components that are considered effective but less desirable due to the presence of ingredients that are harsh and less natural.

The inventors have demonstrated that incorporating at least one biosurfactant and at least one polyglycerol ester surfactant into monophase micellar water, an unexpected and significant improvement in removal efficiency was achieved compared to current benchmark composition that includes PEG/PEO surfactant. Through expert evaluations of makeup removal efficacy, the micellar cleansing composition according to the disclosure has demonstrated performance that exceeded, in some instances by 100%, a commercial benchmark micellar product.

In the various embodiments, the micellar cleansing composition is suitable for application to keratinous tissue for cleansing, particularly for removal of makeup. In some embodiments, the micellar cleansing composition is essentially free of, free of, or devoid of ingredients selected from the group consisting of harsh chemicals, non-nature based ingredients, oils, silicones, film formers, alcohol, paraben, fragrance, sulfates, cationic polymers, PEG/POE surfactants, and combinations thereof.

The micellar cleansing composition, can comprise, consist of, or consist essentially of the essential elements and limitations of the invention described herein, as well as any additional or optional additives, ingredients, components, or limitations described herein or otherwise useful.

Composition

Biosurfactant

The composition according to the invention comprises at least one biosurfactant selected from the group consisting of rhamnolipids, sophorolipids, spiculisporic acid, sodium surfactin, glucolipids, trehalolipids, cellobiose lipids, mannosylerythritol lipid, and combinations thereof.

In some embodiments the micellar cleansing composition includes only one biosurfactant comprising rhamnolipid, for example sold under the name Rheance One™ by Evonik (INCI name: glycolipids), present from at least about 0.1% to about 20%, or from at least about 0.1% to about 4%, or from about 0.2% to about 3%, or about 0.4% to about 1%, or about 0.5%, by weight based on the weight of the micellar cleansing composition.

The term "glycolipid" is understood as meaning a compound formed from a lipid to which are attached one or more sugar compounds.

Glucolipids:

The one or more glycolipids may be glucolipids, which contain a glucose moiety and can be represented by the general formula (I):

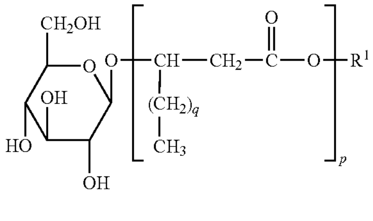

in which:

R1 represents a hydrogen atom or a cation, p denotes an integer ranging from 1 to 4, and q denotes an integer ranging from 4 to 10, preferably equal to 6.

The glucolipids can be produced by the bacterium *Alcaligenes* sp. MM1.

The appropriate fermentation methods are reviewed by M. Schmidt in his doctoral thesis (1990), Technical University of Braunschweig, and by Schulz et al. (1991) Z. Naturforsch, 46C, 197-203. The glucolipids are recovered from the fermentation broth by solvent extraction using diethyl ether or a dichloromethane:methanol or chloroform: methanol mixture.

Rhamnolipids:

The one or more glycolipids may be rhamnolipids.

The composition according to the invention preferably comprises one or more rhamnolipids.

Rhamnolipids are glycolipids produced by various bacterial species. They consist of one rhamnose fragment (mono-rhamnolipid) or of two rhamnose fragments (di-rhamnolipid) linked by a glycosidic bond to one, two or three chains of β-hydroxylated fatty acids linked to one another by an ester bond.

More specifically, these mono-rhamnolipids and di-rhamnolipids correspond to the following formula (VI):

(VI)

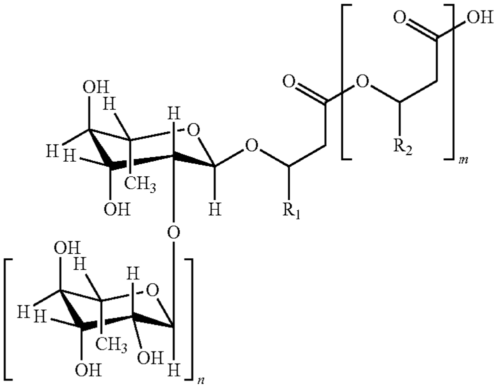

in which:

m denotes an integer equal to 2, 1 or 0, n denotes an integer equal to 1 or 0, and R1 and R2, each independently represent identical or different hydrocarbon radicals having from 2 to 24 carbon atoms, preferably from 5 to 13 carbon atoms, that are branched or unbranched, substituted or unsubstituted, in particular hydroxy-substituted, and saturated or unsaturated, preferably a singly, doubly or triply unsaturated alkyl radical.

Thus, when n is equal to 0, the formula (VI) protects mono-rhamnolipids and, when n is equal to 1, it protects di-rhamnolipids.

The composition according to the invention preferably comprises at least one di-rhamnolipid.

The composition according to the invention preferably comprises at least one di-rhamnolipid of formula (VI) in which:

m denotes an integer equal to 2, 1 or 0;

n denotes an integer equal to 1; and

R1 and R2, each independently represent identical or different hydrocarbon radicals having from 2 to 24 carbon atoms, preferably from 5 to 13 carbon atoms, that are branched or unbranched, substituted or unsubstituted, in particular hydroxy-substituted, and saturated or unsaturated, preferably a singly, doubly or triply unsaturated alkyl radical, and also the salts thereof, solvates thereof and optical isomers thereof.

The glycosidic bond between the two rhamnose fragments may be in the alpha or beta configuration and is preferably in the alpha configuration.

Regarding rhamnolipids, the salts of the di-rhamnolipids of formula (VI) are more particularly the carboxylate salts thereof with an organic or inorganic cation and especially with a cation selected from sodium, potassium, calcium and ammonium.

the solvated forms of the di-rhamnolipids of formula (VI) are more particularly those solvated with one or more molecules of water or of organic solvents, for example a hydrate or a solvate of a linear or branched alcohol, such as ethanol or isopropanol, the optically active carbon atoms of the fatty acids preferably being in the form of the R enantiomers, and the term "alkyl" radical denotes a saturated, linear or branched aliphatic group; for example, a C1-C20 alkyl group having a linear or branched hydrocarbon chain of 1 to 20 carbon atoms, more particularly a methyl, ethyl, propyl, isopropyl, butyl, isobutyl, tert-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl or eicosyl.

The composition according to the invention preferably comprises at least one di-rhamnolipid of formula (VI) in which:

m denotes an integer equal to 2, 1 or 0;

n denotes an integer equal to 1; and

R1 and R2, which are identical or different, are selected from pentenyl, hexenyl, heptenyl, octenyl, nonenyl, decenyl, undecenyl, dodecenyl and tridecenyl radicals and radicals of formula —(CH2)oCH3, with o denoting an integer ranging from 1 to 23, in particular from 3 to 15 and more particularly from 4 to 12.

In some embodiments, rhamnolipids are selected from di-rhamnolipids of general formula (VI) in which m is equal to 1.

According to some embodiments, the composition according to the invention comprises a mixture of at least two, or at least three, di-rhamnolipids of general formula (VI) in which m is preferably equal to 1.

According to some embodiments, the composition according to the invention comprises a mixture comprising at least one mono-rhamnolipid.

According to some embodiments, a rhamnolipid is a dirhamnolipid of the following formula (VII):

(VII)

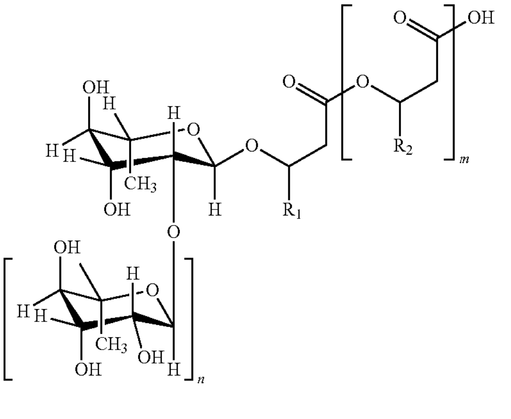

in which:

m denotes an integer equal to 2, 1 or 0; preferably, m is equal to 1, n denotes an integer equal to 1, R1 is a —(CH2)p-CH3 radical, with p being an integer varying from 1 to 23, preferably from 4 to 12, R2 is a —(CH2)q-CH3 radical, with q being an integer varying from 1 to 23, preferably from 4 to 12, and also the salts thereof, solvates thereof and optical isomers thereof.

By way of illustration and without limiting the di-rhamnolipids of formula (VII) that may be suitable for the invention, mention may be made in particular of the compounds of formula di-RL-CXCY, such as are defined in Table A below.

The formula di-RL-CXCY is an alternative way of writing in order to represent a di-rhamnolipid (di-RL) functionalized by two radicals R1 and R2 respectively represented by the symbols CX and CY, the integers X and Y being respectively equal to p+4 and q+4.

TABLE A

| di-rhamnolipids of Formula (VII) | | | |
|---|---|---|---|
| Composés | Di-RL-CXCY | p | q |
| 1 | diRL-C8C8 | 4 | 4 |
| 2 | diRL-C8C10 | 4 | 6 |
| 3 | diRL-C10C8 | 6 | 4 |
| 4 | diRL-C10C10 | 6 | 6 |
| 5 | diRL-C10C12 | 6 | 8 |
| 6 | diRL-C12C10 | 8 | 6 |
| 7 | diRL-C12C12 | 8 | 8 |
| 8 | diRL-C12C14 | 8 | 10 |
| 9 | diRL-C14C12 | 10 | 8 |
| 10 | diRL-C14C14 | 10 | 10 |
| 11 | diRL-C14C16 | 10 | 12 |
| 12 | diRL-C16C14 | 12 | 10 |
| 13 | diRL-C16C16 | 12 | 12 |

According to some embodiments, a rhamnolipid is a di-rhamnolipid of formula (VII) in which p and q are identical and equal to 6 and m is equal to 1, also referred to as di-RL-C10C10, or one of the salts, solvates and optical isomers thereof.

According to some embodiments, a rhamnolipid is a di-rhamnolipid of formula (VII) in which p and q are identical and equal to 6 and m is equal to 1 is present in the composition according to the invention in a proportion of at least 50% by weight and preferably of from 51% to 85% by weight, relative to the total weight of rhamnolipids.

According to some embodiments, a rhamnolipid is a di-rhamnolipid of formula (VII) in which m is equal to 1, p is equal to 6 and q is equal to 8.

According to some embodiments, a rhamnolipid is a di-rhamnolipid of formula(VI) in which n and m are equal to 1, R1 represents a —(CH2)oCH3 radical, with o being an integer varying from 4 to 12, and R2 is selected from the pentenyl, hexenyl, heptenyl, octenyl, nonenyl, decenyl, undecenyl, dodecenyl and tridecenyl radicals; preferably, R1 represents a —(CH2)6CH3 radical and R2 a nonenyl radical.

According to some embodiments, a rhamnolipid is at least two, or at least three, di-rhamnolipids of formula (VI) or of formula (VII) selected from:

a di-rhamnolipid of formula (VII) in which p and q are identical and equal to 6 and m is equal to 1;

a di-rhamnolipid of formula (VII) in which m is equal to 1, p is equal to 6 and q is equal to 8; and at least one di-rhamnolipid of formula (VI) in which n and m are equal to 1, R1 represents a —(CH2)oCH3 radical, with o being an integer varying from 4 to 12, and R2 is selected from the pentenyl, hexenyl, heptenyl, octenyl, nonenyl, decenyl, undecenyl, dodecenyl and tridecenyl radicals; preferably, R1 represents a —(CH2)6CH3 radical and R2 a nonenyl radical.

According to some embodiments, a rhamnolipid is at least two, or at least three, di-rhamnolipids of formula (VI) or of formula (VII) selected from:

at least 50% by weight and preferably of from 51% to 85% by weight of a di-rhamnolipid of formula (VII) in which p and q are identical and equal to 6 and m is equal to 1, relative to the total weight of rhamnolipids.

from 0.5% to 25% by weight, or from 5% to 15% by weight, of a dirhamnolipid of formula (VII) in which p is equal to 6, q is equal to 8 and m is equal to 1, relative to the total weight of rhamnolipids, and from 0.5% to 15% by weight, or from 3% to 12% by weight, preferably from 5% to 10% by weight, of a dirhamnolipid of formula (VI) in which n and m are equal to 1, R1 represents a —(CH2)6CH3 radical and R2 represents a nonenyl radical, relative to the total weight of rhamnolipids.

As specified above, rhamnolipids are customarily prepared by processes known to those skilled in the art starting from bacterial producers, such as *Pseudomonas.*

Appropriate fermentation methods are reviewed by D. Haferburg, R. Hommel, R. Claus and H. P. Kleber in Adv. Biochem. Ing./Biotechnol. (1986), 33, 53-90, and by F. Wagner, H. Bock and A. Kretschmar in Fermentation (ed. R. M. Lafferty) (1981), 181-192, Springer Verlag, Vienna.

Use may be made, as rhamnolipid, of the one sold under the name Rheance One by Evonik (INCI name: glycolipids).

Sophorolipids:

The one or more glycolipids may be sophorolipids, which contain a sophorose moiety and can be represented by the general formula (II):

(II)

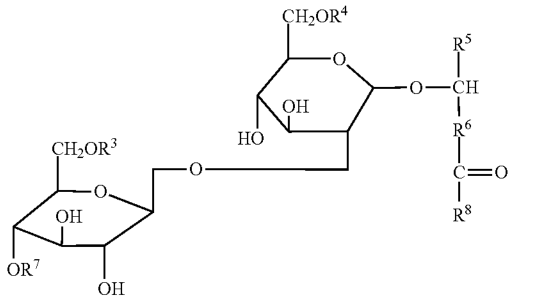

in which:

R3 and R4 individually represent a hydrogen atom or an acetyl group,

R5 represents a saturated or unsaturated, hydroxylated or non-hydroxylated hydrocarbon group having from 1 to 9 carbon atoms, preferably methyl, R6 represents a saturated or unsaturated, hydroxylated or non-hydroxylated hydrocarbon group having from 1 to 19 carbon atoms, with the proviso that the total number of carbon atoms in the groups R5 and R6 does not exceed 20 and is preferably from 14 to 18.

Sophorolipids may be incorporated into the composition according to the invention either in the form of the open-chain free acid, where R7 represents a hydrogen atom and R8 represents a hydroxy group OH, or in its lactone form, where a lactone ring is formed between R7 and R8, as indicated by formula (III):

(III)

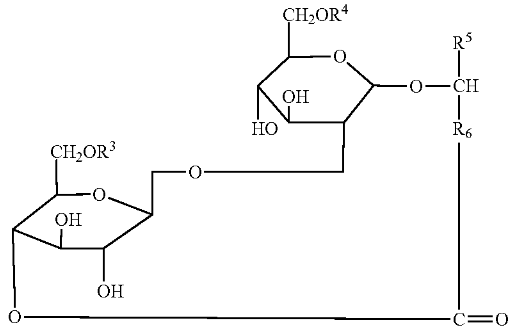

in which:

R3, R4, R5 and R6 are as defined above, with the proviso that at least one of R3 and R4 represents an acetyl group.

The sophorolipids can be produced by yeast cells, for example *Torulopsis* apicola and *Torulopsis bombicola* cells. The fermentation process generally uses sugars and alkanes as substrates.

Appropriate fermentation methods are reviewed in A. P. Tulloch, J. F. T. Spencer and P. A. J. Gorin, Can. J. Chem. (1962), 40, 1326, and U. Gobbert, S. Lang and F. Wagner, Biotechnology Letters (1984), 6 (4), 225. The resulting product is a mixture of various open-chain sophorolipids and of sophorolipid lactones that may be used in the form of mixtures, or the required form may be isolated.

It is possible to use as sophorolipids for example that sold under the Sopholiance S name by Givaudan and that sold under the BioToLife name by BASF.

Trehalolipids:

The one or more glycolipids may be trehalolipids, which contain a trehalose fragment and can be represented by the general formula (IV):

(IV)

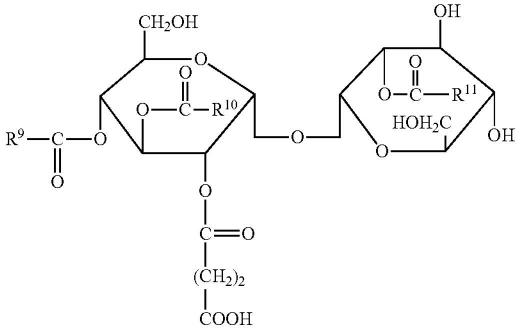

in which:

R9, R10 and R11 individually represent a saturated or unsaturated, hydroxylated or non-hydroxylated hydrocarbon radical having from 5 to 13 carbon atoms.

The trehalolipids can be produced by bacterial fermentation using the marine bacterium *Arthrobacter* sp. Ek 1 or the freshwater bacterium *Rhodococcus erythropolis*. Appropriate fermentation methods are provided by Ishigami et al. (1987), J. Jpn. Oil Chem. Soc., 36, 847-851, Schultz et al. (1991), Z. Naturforsch., 46C, 197-203, and Passeri et al. (1991), Z. Naturforsch., 46C, 204-209.

Cellobiose Lipids:

The one or more glycolipids may be cellobiose lipids, which contain a cellobiose fragment and can be represented by the general formula (V):

(V)

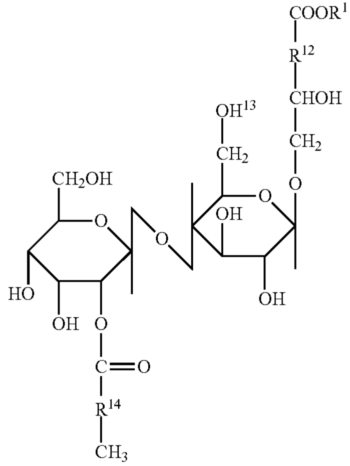

in which:

R1 represents a hydrogen atom or a cation,

R12 represents a saturated or unsaturated, hydroxylated or non-hydroxylated hydrocarbon radical having from 9 to 15 carbon atoms, preferably 13 carbon atoms, R13 represents a hydrogen atom or a acetyl group;

R14 represents a saturated or unsaturated, hydroxylated or non-hydroxylated hydrocarbon radical having from 4 to 16 carbon atoms.

The cellobiose lipids can be produced by cells of fungi of the genus *Ustilago*. Appropriate fermentation processes are provided by Frautz, Lang and Wagner (1986), Biotech. Letts., 8, 757-762.

In some embodiments, the concentration of the at least one biosurfactant is from at least about 0.1% to about 20%, or from at least about 0.1% to about 4%, or from about 0.2% to about 3%, or about 0.4% to about 1%, or about 0.1% to about 0.8%, or about 0.2% to about 0.7%, or about 0.3% to about 0.6%, or about 0.5%, or any suitable combination, sub-combination, range, or sub-range thereof by weight, based on the weight of the micellar cleansing composition. One of ordinary skill in the art, however, will appreciate that other ranges are within the scope of the invention.

Thus, the at least one biosurfactant is present, by weight, based on the total weight of the micellar cleansing composition, from about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 6, 7, 8, 9, 10, 11, 12, 13, 14, 15, 16, 17, 18, 19, to about 20 weight percent, including increments and ranges therein and there between.

Polyglycerol Ester Surfactant

In the various embodiments, the micellar cleansing composition comprises at least one polyglycerol ester surfactant comprising at least one polyglycerol-3 ester surfactant and at least one polyglycerol-4 ester surfactant.

Variously, polyglycerol-3 ester surfactant polyglycerol-4 ester surfactants can be selected from known surfactants, including, but not limited to surfactants selected from the group consisting of Apricot Kernel Oil Polyglyceryl-3 Esters, Apricot Kernel Oil Polyglyceryl-4 Esters, Babassu Oil Polyglyceryl-4 Esters, Borage Seed Oil Polyglyceryl-4 Esters, Candelilla/Jojoba/Rice Bran Polyglyceryl-3 Esters, Diisostearoyl Polyglyceryl-3 Dimer Dilinoleate, Linseed Oil Polyglyceryl-4 Esters, Olive Oil Polyglyceryl-3 Esters, Olive Oil Polyglyceryl-4 Esters, Palm Kernel Oil Polyglyceryl-4 Esters, Palm Oil Polyglyceryl-3 Esters, Palm Oil Polyglyceryl-4 Esters, Polyglyceryl-3 Beeswax, Polyglyceryl-3 Behenate, Polyglyceryl-3 Caprate, Polyglyceryl-3 Caprylate, Polyglyceryl-3 Cocoate, Polyglyceryl-3 Di Hydroxystearate, Polyglyceryl-3 Dicaprate, Polyglyceryl-3 Dicitrate/Stearate, Polyglyceryl-3 Dicocoate, Polyglyceryl-3 Di-Hydroxystearate, Polyglyceryl-3 Diisostearate, Polyglyceryl-3 Dioleate, Polyglyceryl-3 Distearate, Polyglyceryl-3 Isostearate, Polyglyceryl-3 Laurate, Polyglyceryl-3 Myristate, Polyglyceryl-3 Oleate, Polyglyceryl-3 Palmitate, Polyglyceryl-3 Pentacaprylate/Caprate, Polyglyceryl-3 Pentaolivate, Polyglyceryl-3 Pentaricinoleate, Polyglyceryl-3 Rice Branate, Polyglyceryl-3 Ricinoleate, Polyglyceryl-3 Soyate/Shea Butterate, Polyglyceryl-3 Stearate, Polyglyceryl-3 Stearate SE, Polyglyceryl-3 Triisostearate, Polyglyceryl-3 Triolivate, Polyglyceryl-4 Almondate/Shea Butterate, Polyglyceryl-4 Caprate, Polyglyceryl-4 Caprylate, Polyglyceryl-4 Caprylate/Caprate, Polyglyceryl-4 Cocoate, Polyglyceryl-4 Dilaurate, Polyglyceryl-4 Distearate, Polyglyceryl-4 Hazelnutseedate, Polyglyceryl-4 Isostearate, Polyglyceryl-4 Isostearate/Laurate, Polyglyceryl-4 Laurate, Polyglyceryl-4 Laurate/Sebacate, Polyglyceryl-4 Laurate/Succinate, Polyglyceryl-4 Oleate, Polyglyceryl-4 Pentaoleate, Polyglyceryl-4 Pentapalmitate/Stearate, Polyglyceryl-4 Pentastearate, Polyglyceryl-4 Punicate, Polyglyceryl-4 Stearate, Polyglyceryl-4 Sweet Almondate, Polyglyceryl-4 Tristearate, Pumpkin Seed Oil Polyglyceryl-4 Esters, Pumpkin Seed Oil Polyglyceryl-4 Esters Succinate, Rice Bran Oil Polyglyceryl-3 Esters, Shea Butter Polyglyceryl-3 Esters, Shea Butter Polyglyceryl-4 Esters, Sunflower Seed Oil Polyglyceryl-3 Esters, Sunflower Seed Oil Polyglyceryl-4 Esters, Sweet Almond Oil Polyglyceryl-4 Esters, Triisostearoyl Polyglyceryl-3 Dimer Dilinoleate, and combinations thereof.

In some embodiments, the micellar cleansing composition comprises at least one polyglycerol-3 ester surfactant and at least one polyglycerol-4 ester surfactant selected from the group consisting of polyglyceryl-3 caprate, polyglyceryl-3 caprylate/caprate, polyglyceryl-3 laurate, polyglyceryl-4 caprate, polyglyceryl-4 laurate, polyglyceryl-4 caprylate/caprate, and combinations thereof.

In some embodiments, the micellar cleansing composition expressly excludes any other polyglycerol ester surfactants. In some embodiments, the micellar cleansing composition expressly excludes any polyglycerol ester surfactants selected from the group consisting of Polyglyceryl-6/Polyglyceryl-4 Caprylate, Polyglyceryl-3 Caprylate, Polyglyceryl-3/Polyglyceryl-4 Caprylate, Polyglyceryl-6 Caprylate/Ricinoleate, Polyglyceryl-5 Laurate, Polyglyceryl-2 Laurate, Polyglyceryl-6 Dicaprate, Polyglyceryl-6 Caprylate, and combinations thereof.

In some embodiments, the micellar cleansing composition expressly excludes surfactants other than the at least one polyglycerol-3 ester surfactant and the at least one polyglycerol-4 ester surfactant, emulsifiers, and oils other than oil based actives such as the vitamin tocopherol.

The at least one polyglycerol ester surfactant may be present in the micellar cleansing composition in a range from at least about 0.1% to about 5%, based on the weight of the micellar cleansing composition.

In various embodiments, each of the at least one polyglycerol ester surfactant may be present in an amount in the range of from at least about 0.1% to about 20%, and the total amount of surfactant may be present from about 0.1% to about 20%. In some embodiments, each of the at least one polyglycerol ester surfactant is present in an amount that is at least 0.1%, or about 0.5%, or any value, range, or sub-range therebetween by weight, based on the weight of the micellar cleansing composition.

In some embodiments, the at least one polyglycerol ester surfactant includes one of polyglyceryl-3 caprylate/caprate or polyglyceryl-4 caprate present in the micellar cleansing composition in a range from about 0.1% to about 0.8%, or at about 0.5%.

Thus, in various embodiments, each of the at least one polyglycerol ester surfactant may be present in a composition according to the disclosure from about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 6, 7, 8, 9, 10, 11, 12, 13, 14, 15, 16, 17, 18, 19, to about 20 weight percent, including increments and ranges therein and there between, including increments and ranges therein and there between.

Carrier and Optional Additives

Water and Water Based Solvents

In various embodiments, water is present in the micellar cleansing composition in a range from about 70% to about 99%, or from about 85% to about 95%, or any suitable combination, sub-combination, range, or sub-range thereof, by weight, based on the weight of the micellar cleansing composition. One of ordinary skill in the art, however, will appreciate that other ranges are within the scope of the invention.

Thus, water is present, by weight, based on the total weight of the micellar cleansing composition, from about 70, 71, 72, 73, 74, 75, 76, 77, 78, 79, 80, 81, 82, 83, 84, 85, 86, 87, 88, 89, 90, 91, 92, 93, 94, 95, 96, 97, 98, to about 99 weight percent, including increments and ranges therein and there between.

The water used may be sterile demineralized water and/or a floral water such as rose water, cornflower water, chamomile water or lime water, and/or a natural thermal or mineral water such as, for example: water from Vittel, water from the Vichy basin, water from Uriage, water from La Roche Posay, water from La Bourboule, water from Enghien-les-Bains, water from Saint Gervais-les-Bains, water from Neris-les-Bains, water from Allevar-les-Bains, water from Digne, water from Maizieres, water from Neyrac-les-Bains, water from Lons-le-Saunier, water from Eaux Bonnes, water from Rochefort, water from Saint Christau, water from Les Fumades, water from Tercis-les-Bains or water from Avene. The water phase may also comprise reconstituted thermal water, that is to say a water comprising trace elements such as zinc, copper, magnesium, etc., reconstituting the characteristics of a thermal water.

Generally, the pH can be adjusted to the desired value by addition of a base or an acid (organic or inorganic). In view of the inclusion of hydroxy acids in the micellar cleansing composition hereof, the pH is typically adjusted using a base, which in some examples is sodium hydroxide, or using an acid, which in some examples is citric acid.

In some embodiments, the micellar cleansing composition includes one or more water based solvents, for example selected from the group consisting of glycols, monoalcohols such as monohydric $C_1$-$C_8$ alcohols, and combinations thereof. In some embodiments, the micellar cleansing composition includes one or more water based solvents, for example, selected from the group consisting of hexylene glycol, glycerin, pentylene glycol, propanediol, ethanol, propanol, butanol, isopropanol, isobutanol, benzyl alcohol, phenylethyl alcohol, and combinations thereof.

In various embodiments, the amount of water based solvent present in the micellar cleansing composition is in the range from about 0.5% to about 20%, or from about 1% to about 2%, or up to about 5%, or up to about 10%, or any suitable combination, sub-combination, range, or sub-range thereof, by weight, based on the weight of the micellar cleansing composition. One of ordinary skill in the art, however, will appreciate that other ranges are within the scope of the invention.

In some embodiments, the micellar cleansing composition includes at least one water based solvent comprising hexylene glycol, glycerin or a combination thereof, each of which may be present from about 0.5% to about 15%, or from about 1% to about 2%. In some embodiments, the micellar cleansing composition includes no more than 5%, or no more than 10% of water based solvents (other than water). In some embodiments, the micellar cleansing composition includes about from about 0.5% to about 1.5%, or from about 0.9% to about 1% glycerin and about from about 1% to about 3%, or from about 1.5% to about 2% hexylene glycol.

In some embodiments, the composition excludes water based solvents, for example, selected from the group consisting of hexylene glycol, glycerin, pentylene glycol, propanediol, ethanol, propanol, butanol, isopropanol, isobutanol, benzyl alcohol, phenylethyl alcohol, and combinations thereof.

Thus, any one of or a combination of water based solvents may be present, by weight, based on the total weight of the micellar cleansing composition, from about 0.5, 0.6, 0.7, 0.8, 0.9, 1, 2, 3, 4, 5, 6, 7, 8, 9, 10, 11, 12, 13, 14, 15, 16, 17, 18, 19, to about 20 weight percent, including increments and ranges therein and there between.

Optional Additives

In some embodiments, the micellar cleansing composition includes one or more of other optional ingredients selected from the group consisting of skin care actives, humectants, conditioning agents, thickeners, viscosity adjusters, cooling agents, fillers, antimicrobials, preservatives, pH adjusters, chelating agents, and combinations thereof.

In some embodiments, the micellar cleansing composition includes an optional additive comprising the preservative myrtrimonium bromide present at about from about 0.01% to about 0.1%, or from about 0.06% to about 0.07% by weight of the composition and disodium EDTA from about 0.05% to about 0.2%, or from about 0.1% to about 0.15%.

In some embodiments, a micellar cleansing composition includes at least one additive used in the cosmetics field which does not affect the properties of the micellar cleansing composition according to the invention, such as, fragrances, pH adjusters (citric acid, sodium chloride, lactic acid); neutralizing or pH-adjusting agents (e.g., triethylamine (TEA) and sodium hydroxide, Trisodium ethylenediamine disuccinate, and combinations thereof), other cosmetically acceptable additives, such as but not limited to, pearlescent agents, silica, and coloring materials; essential oils; fruit extracts, for example, *Pyrus* Malus (Apple) Fruit Extract, and Aloe Barbadensis Leaf Juice Powder; actives (for example, hydroxyacetophenone); vitamins (for example, vitamin A, beta carotene, tocopherol/vitamin E, panthenol, retinol, resveratrol, vitamin C, niacinamide, derivatives thereof, and combinations thereof); hyaluronic acid in the form of hydrolyzed hyaluronic acid or sodium hyaluronate; coloring materials/pigments; essential oils; antioxidants (phenolic compounds, such as chalcones, flavones, flavanones, flavanols, flavanols, dihydroflavonols, isoflavonoids, neoflavonoids, catechins, anthocyanidins, tannins, lignans, aurones, stilbenoids, curcuminoids, alkylphenols, betacyanins, capsacinoids, hydroxybenzoketones, methoxyphenols, naphthoquinones, and phenolic terpenes, resveratrol, curcumin, pinoresinol, ferulic acid, hydroxytyrosol, cinnamic acid, caffeic acid, p-coumaric acid, baicalin (*Scutellaria baicalensis* root extract), pine bark extract (*Pinus pinaster* bark/bud extract), ellagic acid); vitamins and vitamin derivatives, such as calcium pantothenate, tocopherol and ascorbic acid; hydroxy acids; citric acid, sodium citrate, sodium chloride; neutralizing, chelating or pH-adjusting agents (for example, triethylamine (TEA), trisodium ethylenediamine disuccinate, EDTA, and sodium hydroxide); powders, fragrances, dyes, pigments; organic or mineral UV filters; conditioning agents such as C12-15 Alkyl lactate and C12-15 Alcohols; Thickeners, for example Ammonium polyacryloyldimethyl taurate, Propylene glycol and PEG-55 propylene glycol oleate; viscosity adjusters, for example, Sodium chloride and Hexylene Glycol; cooling agents such as menthol; fillers, for example Kaolin; or any combination thereof. Although the optional additives are given as examples, it will be appreciated that other optional components compatible with cosmetic applications known in the art may be used.

In the various embodiments, the amount of one or more additives, alone or in combination, present in the micellar cleansing composition can be present from about 0.0001% to about 50%, and in some embodiments, from about 0.005% to about 0.01%, and in some embodiments, from about 0.01% to about 0.1%, and in some embodiments, from about 0.15% to about 5%, and in some embodiments, from about 0.40% to about 4%, and in some embodiments, from about 0.5% to about 2.5%, and in some embodiments, from about 0.1% to about 0.5% and in some embodiments, from about 1% to about 2%, or any suitable combination, sub-combination, range, or sub-range thereof by weight, based on the total weight of the micellar cleansing composition. One of ordinary skill in the art, however, will appreciate that other ranges are within the scope of the invention.

Thus, any one or a combination of additives may be present, by weight, based on the total weight of the micellar cleansing composition, each one or the combination present from about 0.0001, 0.0005, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.10, 0.20, 0.30, 0.40, 0.50, 0.60, 0.70, 0.80, 0.90, 1.0, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, to about 50 weight percent, including increments and ranges therein and there between.

In some embodiments, one or more additives in the micellar cleansing composition may include one or more chelating agents selected from trisodium ethylenediamine disuccinate, ethylenediaminetetraacetic acid (EDTA), tetrasodium glutamate diacetate, tetrasodium etidronate, tetrasodium pyrophosphate, pentasodium ethylenediamine tetramethylene phosphonate, sodium staminate and combinations of these.

In some embodiments, the micellar cleansing composition may include one or more water-soluble solvents, for example, glycerin, alcohols (for example, C1-C30, C1-C15, C1-C10, or C1-C4 alcohols), polyols, glycols, and combinations thereof. As examples of organic solvents, non-limiting mentions can be made of monoalcohols and polyols such as ethyl alcohol, isopropyl alcohol, propyl alcohol, benzyl alcohol, and phenylethyl alcohol, or glycols or glycol ethers such as, for example, monomethyl, monoethyl and monobutyl ethers of ethylene glycol, propylene glycol or ethers thereof such as, for example, monomethyl ether of propylene glycol, butylene glycol, hexylene glycol, dipropylene glycol as well as alkyl ethers of diethylene glycol, for example monoethyl ether or monobutyl ether of diethylene glycol. Other suitable examples of organic solvents are ethylene glycol, propylene glycol, butylene glycol, hexylene glycol, propane diol, and glycerin. The organic solvents can be volatile or non-volatile compounds. Further non-limiting examples of water-soluble solvents include alkanols (polyhydric alcohols such as glycols and polyols) such as glycerin, 1,2,6-hexanetriol, trimethylolpropane, ethylene glycol, propylene glycol, diethylene glycol, butylene glycol, hexylene glycol, triethylene glycol, tetraethylene glycol, pentaethylene glycol, dipropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, 2-butene-1,4-diol, 2-ethyl-1,3-hexanediol, 2-methyl-2,4-pentanediol, (caprylyl glycol), 1,2-hexanediol, 1,2-pentanediol, and 4-methyl-1,2-pentanediol; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbit, sorbitan, acetine, diacetine, triacetine, sulfolane, and combinations thereof.

In some embodiments, the micellar cleansing composition may include one or more preservatives selected from organic acids, parabens, formaldehyde donors, phenol derivatives, quaternary ammoniums, alcohols, including isothiazolinones, members from the paraben family such as the methyl, ethyl, propyl, butyl or isobutyl parabens, 4-hydroxy benzoic acid, alcohol preservatives include, but are not limited to, ethanol, benzyl alcohol, dichlorobenzyl alcohol, phenoxyethanol, benzoic acid, sorbic acid, dehydroacetic acid, triclosan, benzyl alcohol, chlorophenesin, or salicylic acid, caprylyl glycol, Myrtrimonium bromide, phenoxyethanol, hydroxyacetophenone, ethylhexyl glycerin, chlorphenesin, cetrimonium chloride, hexyl glycerin, octylglycerin, benzylglycerin, 3-heptoyl-2,2-propandiol, and 1,2-hexandiol; polyaminopropyl biguanide, also known as polyhexamethylene biguanide, or PHMB, alkyl para-hydroxybenzoates, wherein the alkyl radical has from 1, 2, 3, 4, 5 or 6 carbon atoms and for example, from 1 to 4 carbon atoms e.g., methyl para-hydroxybenzoate (methylparaben), ethyl para-hydroxybenzoate (ethylparaben), propyl para-hydroxybenzoate (propylparaben), butyl para-hydroxybenzoate (butylparaben) and isobutyl para-hydroxybenzoate (isobutylparaben), formaldehyde donor preservatives include, but are not limited to, 1,3-Dimethylol-5,5-dimethylhydantoin (DMDM hydantoin), imidazolidinyl urea, gluteraldehyde, quaternary ammonium preservatives include, but are not limited to, benzalkonium chloride, methene ammonium chloride, benzethonium chloride, methylchloroisothiazolinone, methylisothiazolinone, and combinations thereof.

In some embodiments, the micellar cleansing composition may include one or more oils. In some embodiments, the micellar cleansing composition is essentially free, free of or devoid of oils. In some examples, the oils may be chosen from hydrocarbon-based oils. For example, the hydrocarbon-based oil may be a saturated hydrocarbon, an unsaturated hydrocarbon, lipids, triglycerides, a natural oil, and/or a synthetic oil. In some embodiments, the micellar cleansing composition may include a synthetic oil selected from the group consisting of hydrogenated polyisobutene and hydrogenated polydecene. A hydrocarbon-based oil may be a non-volatile hydrocarbon-based, such as:

(i) hydrocarbon-based oils of plant origin, such as glyceride triesters, which are generally triesters of fatty acids and of glycerol, the fatty acids of which can have varied chain lengths from C4 to C24, it being possible for these chains to be saturated or unsaturated and linear or branched; these oils are in particular wheat germ oil, sunflower oil, grape seed oil, sesame oil, corn oil, apricot oil, castor oil, shea oil, avocado oil, olive oil, soybean oil, sweet almond oil, palm oil, rapeseed oil, cottonseed oil, hazelnut oil, macadamia oil, jojoba oil, alfalfa oil, poppy oil, pumpkin seed oil, marrow oil, blackcurrant oil, evening primrose oil, millet oil, barley oil, quinoa oil, rye oil, safflower oil, candlenut oil, passionflower oil, musk rose oil, and essential oils, such as *Helianthus annuus* Seed Oil, *Lavandula angustifolia* (lavender) Oil, *Mentha piperita* Oil, *Rosmarinus officinalis* (rosemary) Leaf Oil *Pelargonium graveolens* flower oil, *Citrus aurantium dulcis* (orange) peel oil, *Menthe viridis* (spearmint) leaf oil, *Citrus aurantifolia* (lime) oil, *Melaleuca alternifolia* (tea tree) leaf oil, *Citrus grandis* (grapefruit) peel oil, *Citrus medica* Limonum (lemon) peel oil, rose flower oil, *Eucalyptus globulus* leaf oil, and combinations thereof.

(ii) synthetic ethers containing from 10 to 40 carbon atoms;

(iii) linear or branched hydrocarbons of mineral or synthetic origin, such as petroleum jelly, polydecenes, hydrogenated polyisobutene such as Parleam, and squalane;

(iv) synthetic esters, for instance oils of formula RCOOR' in which R represents a linear or branched fatty acid residue containing from 1 to 40 carbon atoms and R' represents a hydrocarbon-based chain that is especially branched, containing from 1 to 40 carbon atoms on condition that R+R' is ÿ 10, for instance Purcellin oil (cetearyl octanoate), isopropyl myristate, isopropyl palmitate, C12-C15 alkyl benzoate, such as the product sold under the trade name Finsolv TN™ or Witconol TN™ by Witco or Tegosoft TN™ by Evonik Goldschmidt, 2-ethylphenyl benzoate, such as the commercial product sold under the name X-Tend 226 by ISP, isopropyl lanolate, hexyl laurate, diisopropyl adipate, isononyl isononanoate, oleyl erucate, 2-ethylhexyl palmitate, isostearyl isostearate, diisopropyl sebacate, such as the product sold under the name of "Dub Dis" by Stearinerie Dubois, octanoates, decanoates or ricinoleates of alcohols or polyalcohols, such as propylene glycol dioctanoate; hydroxylated esters, such as isostearyl lactate or diisostearyl malate; and pentaerythritol esters; citrates or tartrates, such as di(linear C12-C13 alkyl) tartrates, such as those sold under the name Cosmacol ETI™ by Enichem Augusta Industriale, and also di(linear C14-C15 alkyl) tartrates, such as those sold under the name Cosmacol ETL™ by the same company; or acetates;

(v) fatty alcohols that are liquid at room temperature, containing a branched and/or unsaturated carbon-based chain containing from 12 to 26 carbon atoms, for instance octyldodecanol, isostearyl alcohol, oleyl alcohol, 2-hexyldecanol, 2-butyloctanol or 2-undecylpentadecanol;

(vi) higher fatty acids, such as oleic acid, linoleic acid or linolenic acid;

(vii) carbonates, such as dicaprylyl carbonate, such as the product sold under the name Cetiol CC™ by Cognis;

(viii) fatty amides, such as isopropyl N-lauroyl sarcosinate, such as the product sold under the trade name Eldew SL 205™ from Ajinomoto; and (ix) essential oils selected from the group consisting of sunflower oil, sesame oil, peppermint oil, macadamia nut oil, tea tree oil, evening primrose oil, sage oil, rosemary oil, coriander oil, thyme oil, pimento berries oil, rose oil, anise oil, balsam oil, bergamot oil, rosewood oil, cedar oil, chamomile oil, sage oil, clary sage oil, clove oil, cypress oil, eucalyptus oil, fennel oil, sea fennel oil, frankincense oil, geranium oil, ginger oil, grapefruit oil, jasmine oil, juniper oil, lavender oil, lemon oil, lemongrass oil, lime oil, mandarin oil, marjoram oil, myrrh oil, neroli oil, orange oil, patchouli oil, pepper oil, black pepper oil, petitgrain oil, pine oil, rose otto oil, rosemary oil, sandalwood oil, spearmint oil, spikenard oil, vetiver oil, wintergreen oil, and ylang ylang.

In some embodiments the micellar cleansing composition may include at least one branched or linear liquid alkane with carbon chain length of C11 to C20. In various embodiments, liquid alkanes may be selected from those with a carbon chain length of from C11 to C20. The liquid alkanes may be selected from those with a carbon chain length of from C11 to C20, or from C15 to C19, or one of C11, C12, C13, C14, C15, C16, C17, C18 to C19. In some particular embodiments, suitable liquid alkanes that may be used according to the disclosure include hydrocarbon-based oils containing from 8 to 16 carbon atoms, and especially branched C8-C16 alkanes such as C8-C16 isoalkanes. In some exemplary embodiments, such liquid alkanes may be chosen from isoparaffins, for instance isododecane (also known as 2,2,4,4,6-pentamethylheptane), isodecane, and isohexadecane.

In some embodiments, one or more additives in the micellar cleansing composition may include one or more waxes, wherein a wax is a lipophilic compound that is solid at room temperature (25° C.), with a reversible solid/liquid change in state, having a melting point of greater than or equal to 30° C., which may be up to 200° C. and in particular up to 120° C., and chosen from waxes that are solid at room temperature of animal, plant, mineral or synthetic origin, and mixtures thereof. Mention may be made of hydrocarbon waxes, for instance beeswax, lanolin wax, Chinese insect waxes, rice bran wax, carnauba wax, candelilla wax, ouricury wax, esparto wax, berry wax, shellac wax, Japan wax and sumac wax; montan wax, orange wax and lemon wax, refined sunflower wax sold under the name Sunflower Wax by Koster Keunen, microcrystalline waxes, paraffins and ozokerite; polyethylene waxes, the waxes obtained by the Fischer-Tropsch synthesis and waxy copolymers, and also esters thereof.

In some embodiments, the micellar cleanser may include one or more amphoteric surfactants (or zwitterionic surfactant). In some embodiments, the micellar cleansing composition comprises more than one amphoteric surfactant. In some embodiments, the micellar cleansing composition may include or excludes any one or more of nonionic, cationic, or anionic surfactants, and in particular embodiments, excludes PEG/POE surfactants. In some embodiments, the micellar cleansing composition includes a combination amphoteric surfactants. In some embodiments, the at least one amphoteric surfactant may include cocamidopropyl hydroxysultaine, cocamidopropyl betaine, coco betaine, sodium lauroamphoacetate, disodium cocoamphodiacetate, or a combination thereof. In some particular embodiments, the micellar cleansing composition includes a combination of surfactants that comprise cocamidopropyl hydroxysultaine, cocamidopropyl betaine, coco betaine, sodium lauroamphoacetate, disodium cocoamphodiacetate, or a combination thereof. In some embodiments the at least one amphoteric surfactant may be selected from, for example, betaines, alkyl sultaines, alkyl amphoacetates and alkyl amphodiacetates, alkyl amphoproprionates, amphocarboxylates, alkyl betaines, amidoalkyl betaines, amphophosphates, phosphobetaines, pyrophosphobetaines, carboxyalkyl polyamines, amidoalkyl sultaines, salts thereof, or mixtures thereof.

Betaines which can be used in the current compositions include those having the formulas below:

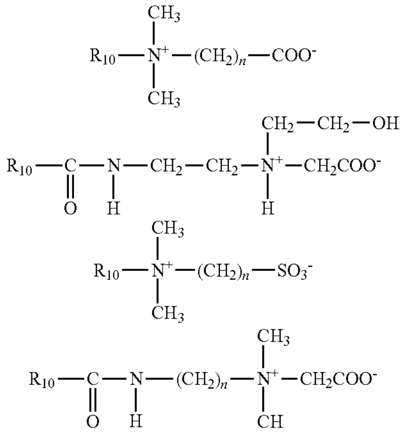

wherein $R^{10}$ is an alkyl group having 8-18 carbon atoms; and n is an integer from 1 to 3.

Particularly useful betaines include, for example, cocoamidopropyl hydroxysultaine, coco betaine, cocoamidopropyl betaine, lauryl betaine, laurylhydroxy sulfobetaine, lauryldimethyl betaine, behenyl betaine, capryl/capramidopropyl betaine, lauryl hydroxysultaine, stearyl betaine, and mixtures thereof. Typically, the at least one betaine compound is selected from the group consisting of coco betaine, cocoamidopropyl betaine, behenyl betaine, capryl/capramidopropyl betaine, lauryl betaine, and mixtures thereof, and more typically coco betaine.

Hydroxyl sultaines useful in the micellar cleansing compositions of the invention include the following

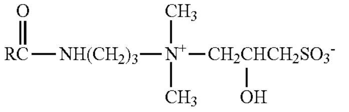

wherein

R is an alkyl group having 8-18 carbon atoms.

More specific examples include, but are not limited to cocamidopropyl hydroxysultaine, lauryl hydroxysultaine, or mixtures thereof.

Useful alkylamphoacetates include those having the formula

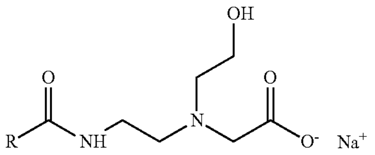

wherein

R is an alkyl group having 8-18 carbon atoms.

useful alkyl amphodiacetates include those having the formula

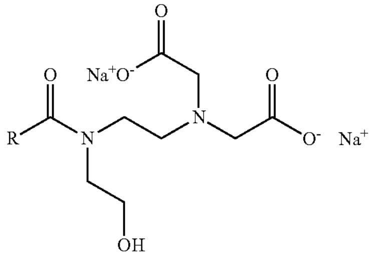

wherein

R is an alkyl group having 8-18 carbon atoms.

Alkyl Amphopropionates

Exemplary and non-limiting examples of useful alkyl amphopropionates include cocoamphopropionate, caprylamphopropionate, cornamphopropionate, caproampho-propionate, oleoamphopropionate, isostearoamphopropionate, stearoamphopropionate, lauroamphopropionate, salts thereof, or mixtures thereof.

The at least one amphoteric surfactant of the present disclosure may be optionally quaternized secondary or tertiary aliphatic amine derivatives, in which the aliphatic group is a linear or branched chain comprising from 8 to 22 carbon atoms, said amine derivatives containing at least one anionic group, for instance a carboxylate, sulfonate, sulfate, phosphate or phosphonate group.

In some embodiments the micellar cleanser may include one or more co-emulsifiers or surfactants chosen from isopropyl myristate, isopropyl palmitate, ethylhexyl palmitate, methyl palmitate, 2-ethylhexyl palmitate, hexyl laurate, ethylhexyl laurate, isopropyl laurate, ethylhexyl oleate, ethylhexyl isononanoate, isononyl isononanoate, myristyl myristate, 2-ethylhexyl caprate/caprylate (or octyl caprate/caprylate), isostearyl neopentanoate, cetearyl ethylhexanoate, isopropyl isostearate, diisopropyl sebacate, coco caprylate/caprate, diisopropyl adipate, esters of lactic acid and of fatty alcohols comprising 12 or 13 carbon atoms, polyglyceryl-10 caprate, polyglyceryl-10 caprylate/caprate, polyglyceryl-10 cocoate, polyglyceryl-10 laurate, polyglyceryl-10 myristate, polyglyceryl-10 oleate, polyglyceryl-10 stearate, polyglyceryl-11 cocoate, polyglyceryl-11 myristate, polyglyceryl-11 oleate, polyglyceryl-11 stearate, polyglyceryl-12 cocoate, polyglyceryl-12 myristate, polyglyceryl-12 oleate, polyglyceryl-12 stearate, polyglyceryl-2 oleate, polyglyceryl-5 caprate, polyglyceryl-5 caprylate/caprate, polyglyceryl-5 laurate, polyglyceryl-6 caprate, polyglyceryl-6 caprylate/caprate, polyglyceryl-6 cocoate, polyglyceryl-6 dicaprate, polyglyceryl-6 laurate, polyglyceryl-6 myristate, polyglyceryl-7 caprate, polyglyceryl-7 caprylate/caprate, polyglyceryl-7 cocoate, polyglyceryl-7 laurate, polyglyceryl-7 myristate, polyglyceryl-8 caprate, polyglyceryl-8 caprylate/caprate, polyglyceryl-8 cocoate, polyglyceryl-8 laurate, polyglyceryl-8 myristate, polyglyceryl-9 caprate, polyglyceryl-9 caprylate/caprate, polyglyceryl-9 cocoate, polyglyceryl-9 laurate, polyglyceryl-9 myristate, and combinations thereof.

In some embodiments, the micellar cleanser may include one or more cationic polymers. Cationic polymers may be selected from nature-based polymers that are polysaccharides, and other natural (i.e., plant, animal, or bacterial based), synthetic, or modified cationic nature-based or synthetic polymers wherein a nature-based polymer may be selected from cationic forms and cationic derivatives of polysaccharides isolated from algae, polysaccharides produced by microorganisms, and polysaccharides from higher plants, such as homogeneous polysaccharides. A cationic nature-based polymer may be selected from polysaccharides may be chosen from polysaccharides that include chitosan, chitin, starches, alginates, celluloses, galactomannans such as guar gums, particularly cationic derivatives thereof, including chitosan, chitosan oligosaccharide, polymeric chitosan having MW from 1 kDa to about 1000 kDa, derivatives of chitosan, derivatives of chitosan having enhanced solubility, cyclodextrin, cationic gelatin, cationic dextran, cationic cellulose, polylysine, polyornithine, histone, collagen, chitosan-cysteine, chitosan-thiobutylamidine, chitosan-thioglycolic acid, chitin, starch, starch derivatives, cellulose (for example, but not limited to, ethylcellulose, nitrocellulose, hemicellulose, and hemicellulose derivatives), alginates, including but not limited to, sodium alginate, and combinations thereof. Examples of cationic polymers also include polysaccharide-based delivery molecules (e.g., chitosan, cyclodextrin, cationic gelatin, cationic dextran, cationic cellulose), cationic peptides and their derivatives (e.g., polylysine, polyornithine), peptide/protein polymers ((e.g., histone, collagen), linear or branched synthetic polymers (e.g., polybrene, polyethyleneimine), natural polymers (e.g., histone, collagen), synthetic dendrimers, cationic thiolated biopolymers (nature-based thiomers or nature-based dendrimers, e.g., chitosan-cysteine, chitosan-thiobutylamidine as well as chitosan-thioglycolic acid), including methylcelluloses, hydroxyalkylcelluloses, ethylhydroxyethylcelluloses and carboxymethylcelluloses, mannans, xylans, lignins, arabans, galacturonans, alginate-based compounds, chitin, glucuronoxylans, arabinoxylans, xyloglucans, glucomannans, fructosans such as inulin, pectic acids and pectins, arabinogalactans, agars, glycosaminoglycans, gum arabics, tragacanth gums, ghatti gums, karaya gums, locust bean gums, biopolysaccharide gums of microbial origin such as scleroglucan or xanthan gums, mucopolysaccharides, chondroitin sulfates, and mixtures thereof. Cationic polymers may be selected from synthetic polymers. In some examples, the synthetic polymers are non-silicone based, and in some embodiments may be selected from the group consisting of polyquaterniums, that is polymers having quaternary ammonium centers in the polymer, for example, including polyquaternium-47 (1-Propanaminiun, N,N,N-trinethyl-3-[(2-methyl-1-oxo-2-propenyl)amino], chloride, polymer with methyl 2-propenoate and 2-propenoic acid). Other non-limiting examples of such polyquaternium compounds may be selected from diallyidimethylammonium chloride/acrylic acid copolymers sold under the names MERQUAT 280 POLYMER or MERQUAT 280NP POLYMER or MERQUAT 281 POLYMER or MERQUAT 295 POLYMER, by the company Nalco (Lubrizol) (INCI name: Polyquaternium-22); the copolymer of methacrylamidopropyltrimonium chloride, of acrylic acid and or methyl acrylate, sold under the name MERQUAT 2001 POLYMER OR MERQUAT 2001N POLYMER by the company Nalco (Lubrizol) (INCI name: Polyquaternium-47); the acrylamide/dimethyldiallylammonium chloride/acrylic acid terpolymer sold under the name MERQUAT 3330DRY POLYMER or MERQUAT 3330PR POLYMER or MERQUAT 3331PR POLYMER or MERQUAT 3940 POLYMER or MERQUAT PLUS 3330 POLYMER OR MERQUAT PLUS 3331 POLYMER by the company Nalco (Lubrizol) (INCI name: Polyquaternium-39); an ampholytic terpolymer consisting of methacrylamidopropyl trimethyl ammonium chloride (MAPTAC), acrylamide and acrylic acid, sold under the name MERQUAT 2003PR POLYMER by the company Nalco (Lubrizol) (INCI name: Polyquaternium-53); Polyquaternium-30, Polyquaternium-35, Polyquaternium-45, Polyquaternium-50, Polyquaternium-54; Polyquaternium-57; Polyquaternium-63; Polyquaternium-74; Polyquaternium-76; Polyquaternium-86; Polyquaternium-89; Polyquaternium-95; Polyquaternium-98, Polyquaternium-104; Polyquaternium-111; Polyquaternium-112, and mixtures thereof. In some embodiments, the cationic polymer is a synthetic polymer selected from cationic acrylic polymers, for example, an amorphous functional acrylic polymer grafted onto a polyethylene backbone such as SYNTRAN™ 5330, which is a quaternary modified olefin grafted technology. More generally, such synthetic polymers selected from, but are not limited to, cationic polymers comprising polyacrylates such as those identified in the International Cosmetic Ingredient Dictionary and Handbook (9 th ed. 2002) such as, for example, polyacrylate-1, polyacrylate-2, polyacrylate-3, polyacrylate-4, polyacrylate-16, polyacrylate-17, polyacrylate-18, polyacrylate-19, polyacrylate-21, and mixtures thereof. Such (co)polymers, or similar (co)polymers, can be combined individually or with other (co)polymers in such a way to form suitable bimodal agents having both cationic and anionic functionalities.

It will be appreciated that in some embodiments, the micellar cleansing composition may include or may be substantially or essentially free of or may be devoid of certain ingredients including any of the specific optional additives. In some embodiments, the micellar cleansing composition may include may be substantially or essentially free of or may exclude any one or more of ingredients selected from sulfates, sulfate surfactants, PEG-type components, PEG-type thickeners and surfactants, petrochemical based compounds, silicone compounds, or combinations thereof.

In some embodiments, the micellar cleansing composition may include may be substantially or essentially free of or may exclude any one or more of ingredients selected from PEG/PEO surfactants, sulfate/sulfonate based surfactants, and anionic surfactants, including, but not limited to, PEG-20 glyceryl triisostearate, PEG-7 glyceryl cocoate, PEG-20 methylglucoside sesquistearate, PG-5 dioleate, PG-4 diisostearate, PG-10 isostearate, PEG-60 hydrogenated castor oil, PEG-8 stearate, PEG-8 isostearate, PEG-60 hydrogenated castor oil, PEG-150 Laurate, PEG-150 Distearate, PEG-150 pentaerythrityl tetrastearate, PEG-78 Glyceryl Cocoate, PEG-30 Glyceryl Cocoate, Ceteareth-20, Ceteth-10, Ceteth-20, Isoceteth-20, Laureth-4, Laureth-23, Oleth-10, Oleth-20, Steareth-10, Steareth-20, Steareth-100, and Steareth-21, PEG-20 glyceryl laurate, PEG-40 hydrogenated castor oil, poloxamer 184 (polyoxyethylene polyoxypropylene glycol), and combinations thereof.

Although the optional additives are given as examples, it will be appreciated that other optional components compatible with cosmetic applications known in the art may be used that are suitable. It will be appreciated by a skilled artisan that any optional additives are present only to the extent and in amounts that do not materially adversely affect the basic and novel characteristic(s) of the claimed disclosure. Thus, in some embodiments that include optional additives, such optional additives will not materially adversely affect the basic and novel characteristic(s) of the claimed invention.

EXAMPLES

The following examples are intended to further illustrate the present disclosure. They are not intended to limit the disclosure in any way. Unless otherwise indicated, all parts are by weight.

Example 1: Raw Materials

Percentages of each ingredient as may be exemplified in the following examples are shown as amount of active, wherein the raw materials may be present in an amount that is equal to the amount of active, or if the raw material has a concentration of active that is less than 100% then the micellar cleansing composition includes the raw material that includes active and a suitable solvent, wherein the concentration of active in the raw material is provided herein below.

The following raw materials for ingredients as shown in the TABLES herein include actives listed in Table 1.

TABLE 1

| Representative Raw Materials Raw Material |
|---|
| PG-3 Caprylate/Caprate |
| PG-4 Caprate |
| Rhamnolipid |
| Sophorolipid |
| Spiculisporic acid |
| Sodium Surfactin |

Example 2: Inventive Compositions

Exemplary embodiments of micellar cleansing composition are set forth in Table 2, below.

TABLE 2 A

| Inventive Compositions: Base Composition | |
|---|---|
| INGREDIENT | Wt % |
| water | QS |
| disodium EDTA | 0.05-0.2 |
| myrtrimonium bromide | 0.01-0.1 |
| glycerin | 0.5-1.5 |
| hexylene glycol | 1-3 |
| Polyglycerol Ester Surfactant (PES) | 0.5 |
| Biosurfactant (BS) | 0.5 |

TABLE 2 B

| Inventive Compositions: Base Composition Plus Substituted Polyglycerol Ester Surfactants (PES) and Biosurfactant (BS) | | | | | | | | |
|---|---|---|---|---|---|---|---|---|
| INGREDIENT | INV A | INV B | INV C | INV D | INV E | INV F | INV G | INV H |
| Polyglyceryl-3 Caprylate/Caprate (PES) | 0.5 | 0.5 | 0.5 | 0.5 | | | | |
| Polyglyceryl-4 Caprate (PES) | | | | | 0.5 | 0.5 | 0.5 | 0.5 |
| Rhamnolipid (BS) | 0.5 | | | | 0.5 | | | |
| sophorolipid (BS) | | 0.5 | | | | 0.5 | | |
| spiculisporic acid (BS) | | | 0.5 | | | | 0.5 | |
| sodium surfactin (BS) | | | | 0.5 | | | | 0.5 |

Example 3: Comparative Composition

An ingredients list of a commercially available comparable micellar cleansing composition is set forth in Table 3, below. The comparative composition (COMP 1) includes a PEG surfactant, no rhamnolipid and no polyglycerol ester surfactant.

TABLE 3

| Comparative (commercial benchmark) Composition Ingredients in COMP 1 |
|---|
| Water |
| hexylene glycol |
| glycerin |
| disodium cocoamphodiacetate |
| poloxamer 184 (PEG surfactant) |
| preservative/chelator |

Example 4: Biosurfactant Solubility/pH

Table 4 provides minimum pH requirements to achieve solubility for the different biosurfactants.

TABLE 4

| Minimum pH for 1% Biosurfactant in water | |
|---|---|
| Biosurfactant | Minimum pH |
| Rhamnolipid | 5.5 |
| Sophorolipid | 5.0 |
| Spiculisporic acid | 5.5 |
| Sodium surfactin | 7.5 |

Example 5: Makeup Removability

Compositions were evaluated for removability of foundation makeup from artificial skin protein substrate based on color change.

Method of Determination of Color Change:

The color difference associated with removal of makeup, ΔE (delta-E; color difference in a rectangular coordinate system), value was measured by Datacolor 600.

Clean reference: completely clean substrate, without makeup applied.

Black reference: substrate with makeup applied, but before removal.

Sample after removal: substrate with makeup applied, and after removal performed.

The equation below was used to calculate the removal efficacy.

$$\text{Removability} = \frac{De_{sample\ after\ removal} - De_{black\ reference}}{De_{clean\ reference} - De_{black\ reference}}$$

Maybelline Fit Me Matte+Poreless Foundation was applied to artificial skin protein substrate for in vitro removability test.

After foundation dried, 1.5 gram of each evaluated composition formulation was applied to wet cotton pad then to remove the makeup.

Removal Efficiency with Polyglyceryl Surfactants with/without Biosurfactants

The compositions listed in Table 5 include only water and polyglycerol ester surfactant.

TABLE 5

Removal Efficiency with Varied Polyglyceryl Surfactants at 1% active in water (no Biosurfactant or other ingredient)

| SURFACTANT | Composition | Removability | Appearance |
|---|---|---|---|
| Polyglyceryl-3 Caprylate/Caprate | ALT 1 | 73% | Clear |
| Polyglyceryl-4 Caprate | ALT 2 | 72% | Clear |
| Polyglyceryl-6/Polyglyceryl-4Caprylate | ALT 3 | 58% | Clear |
| Polyglyceryl-3 Caprylate | ALT 4 | 62% | Hazy |
| Polyglyceryl-3/Polyglyceryl-4 Caprylate | ALT 5 | 73% | Hazy |
| Polyglyceryl-6 Caprylate/Ricinoleate | ALT 6 | 68% | Hazy |
| Polyglyceryl-5 Laurate | ALT 7 | 65% | Hazy |
| Polyglyceryl-2 Laurate | ALT 8 | 70% | Hazy |
| Polyglyceryl-6 Dicaprate | ALT 9 | 66% | Hazy |
| Polyglyceryl-6 Caprylate | ALT 10 | 73% | Hazy |
| COMMERCIAL BENCHMARK | COMP 1 | 40% | Clear |

As shown in Table 5, COMP 1, and polyglycerol ester surfactants (without biosurfactant), listed as ALT 1-ALT 10, the commercial benchmark, were tested for makeup removal efficacy. Each of the polyglycerol ester surfactants (without biosurfactant) demonstrated enhanced makeup removal and left less residual makeup on tester arms as compared to COMP 1, demonstrating the general superiority of polyglycerol ester surfactants, even when used alone, over COMP 1.

Removal Efficiency with Varied Biosurfactants and Polyglyceryl-3 and -4 Surfactants The compositions listed in Table 6 are those inventive compositions as shown in Table 2 B, and the comparative composition COMP 1.

TABLE 6

Removal Efficiency with Varied Biosurfactants

| Biosurfactant | Surfactant | Composition | Removal Performance (% removal) |
|---|---|---|---|
| Rhamnolipid | Polyglyceryl-3 Caprylate/Caprate | INV A | 79 |
| Sophorolipid | Polyglyceryl-3 Caprylate/Caprate | INV B | 57 |
| Spiculisporic acid | Polyglyceryl-3 Caprylate/Caprate | INV C | 64 |
| Sodium surfactin | Polyglyceryl-3 Caprylate/Caprate | INV D | 80 |
| Rhamnolipid | Polyglyceryl-4 Caprate | INV E | 83 |
| Sophorolipid | Polyglyceryl-4 Caprate | INV F | 60 |
| Spiculisporic acid | Polyglyceryl-4 Caprate | INV G | 71 |
| Sodium surfactin | Polyglyceryl-4 Caprate | INV H | 67 |
| Benchmark Micellar Water | NA | COMP 1 | 40 |

As shown in Table 6, all tested compositions, as compared to COMP 1, demonstrated enhanced makeup removal and left less residual makeup on tester arms. The results demonstrate that the combinations of rhamnolipid and polyglyceryl-4 caprate, rhamnolipid with polyglyceryl-3 caprylate/caprate, and rhamnolipid with polyglyceryl-3 caprylate/caprate provide the greatest extent of makeup removal, demonstrating unexpectedly a more than a 60% increase and up to more than a 100% increase in performance over the commercial benchmark. In addition, the results with combined rhamnolipid and polyglyceryl-4 caprate, rhamnolipid with polyglyceryl-3 caprylate/caprate, and rhamnolipid with polyglyceryl-3 caprylate/caprate demonstrate an at least a 10-15% improvement over the performance of the individual polyglycerol ester surfactants alone (polyglyceryl-4 caprate (72%) and polyglyceryl-3 caprylate/caprate (73%). These results are also unexpected in that polyglycerol-3 caprylate/caprate and polyglycerol-4 caprate surfactants in combination with the biosurfactants outperformed the other polyglycerol ester/biosurfactant combinations. The results show that it is possible to provide a micellar cleanser that delivers high removability of makeup that exceeds the commercial benchmark, employs less harsh and more sustainable ingredients, and supports solubilization of ingredients to provide a clear, non-hazy, pleasing appearance and sensory aesthetic on application that is important to consumers.

While the disclosure has been described with reference to described embodiments, it will be understood by those skilled in the art that various changes may be made, and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure is not limited to the particular embodiment disclosed as the best mode contemplated for carrying out this disclosure, but that the disclosure will include all embodiments falling within the scope of the appended claims.

Definitions

"Cleanser" or "micellar cleansing composition" as used herein means and refers to a micellar cleansing composition utilized for application to a keratinous tissue for one or more of cleansing the skin, removal of make-up and the like.

"Keratinous substrate" and "keratinous tissue" each includes but is not limited to skin, hair, and nails.

"Micellar" as used herein in reference to the inventive micellar cleansing composition means that the micellar cleansing composition consists of a water phase with suspended micellar aggregates of surfactant and cationic polymer that are easily suspended in the water phase by agitation and which rapidly separate/phase out when the micellar cleansing composition is at rest. It should be understood that the micellar cleansing composition does not include any significant oil content and thus does not include an oil phase. The micellar cleansing composition is shaken or agitated to achieve suspension of the surfactants prior to application. The pre-application agitation forms a suspension of sufficient uniformity and stability to allow a uniform application to keratinous tissue for the removal of make-up. Further, transparency of a micellar cleansing composition indicates that all ingredients have been adequately solubilized, in particular, the polyglycerol ester surfactants. The micellar cleansing composition is light-weight, much like a toner, with a pleasing feel upon application.

"Natural" or "Nature-based" as used herein means and refers to cosmetically acceptable materials and components that are one or more of directly obtained from nature, are obtained from nature with minimal processing, and are derivatives of materials that are obtained from nature. Cleansing composition according to the instant disclosure are in some embodiments up to 99.11% natural, or "Highly natural" or "All Natural" which means that all carbon atoms of intentionally added ingredients are from natural sources per ISO 16128.

"Petrochemical-free" means that excluded petrochemical have not been added as a component. Some specific but non-limiting examples of petrochemicals that are lacking from the micellar cleansing composition include benzalkonium chloride, isododecane, isohexadecane and the like. In some embodiments, the micellar cleansing composition is not free from petrochemicals, but is formulated to have an amount of petrochemicals that is at or below the amounts found in similar compositions that are commercially available.

"Silicone-free" means that excluded silicones have not been added as a component. In some embodiments, a composition is devoid of silicones. Some specific but non-limiting examples of silicones that are lacking from the micellar cleansing composition includes, but is not limited to, silicone polymers, for example selected from dimethicone, cyclopentasiloxane, and other silicone oils, and silicone elastomers.

"Skin" as used herein means and refers to skin materials containing keratin such as facial and body skin, scalp, eyebrows, and lips.

An inventive composition is "Stable" or demonstrates "Stability" as those terms may be used herein if it does not show any signs of significant changes in one or more of color, odor, pH, or transparency or increased viscosity or evident precipitation of an ingredient at room temperature and at temperatures in the range from about 25° C. to about 45° C. In some embodiments, a micellar cleansing composition is stable at 25° C. for at least one month, or at least two months, or longer. As described herein, some tested compositions demonstrate haziness which may be associated with insufficient solubilization, particularly of the polyglycerol ester surfactants, or precipitation of one or more ingredients demonstrating instability of the micellar cleansing composition; while haziness is not dispositive of effectiveness, in some embodiments compositions which are hazy are deemed less suitable due to consumer expectations of visual aesthetics.

"Active material" as used herein with respect to the percent amount of an ingredient or raw material, refers to 100% activity of the ingredient in the raw material except as specifically stated. All amounts given herein are relative to the amount of active material, unless otherwise indicated.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one" or "one or more" as used herein, means that there may be one, two, three or more and thus includes individual components as well as mixtures/combinations.

The transitional terms "comprising," "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step, or material. The term "consisting of" excludes any element, step, or material other than those specified in the claim, and, in the latter instance, impurities ordinarily associated with the specified material(s). The term "consisting essentially of" limits the scope of a claim to the specified elements, steps, or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Other than in the operating examples, or where otherwise indicated, all numbers expressing quantities of ingredients and/or reaction conditions are to be understood as being modified in all instances by the term "about," meaning within 10% of the indicated number (e.g., "about 10%" means 9%-11% and "about 2%" means 1.8%-2.2%).

All percentages and ratios are calculated by weight unless otherwise indicated. All percentages are calculated based on the total composition unless otherwise indicated. Generally, unless otherwise expressly stated herein, "weight" or "amount" as used herein with respect to the percent amount of an ingredient refers to the amount of the raw material comprising the ingredient, wherein the raw material may be described herein to comprise less than and up to 100% activity of the ingredient. Therefore, weight percent of an active in a composition is represented as the amount of raw material containing the active that is used and may or may not reflect the final percentage of the active, wherein the final percentage of the active is dependent on the weight percent of active in the raw material.

All ranges and amounts given herein are intended to include subranges and amounts using any disclosed point as an end point. Thus, a range of "1% to 10%, such as 2% to 8%, such as 3% to 5%," is intended to encompass ranges of "1% to 8%," "1% to 5%," "$^2$% to 10%," and so on. All numbers, amounts, ranges, etc., may be modified by the term "about." Similarly, a range given of "about 1% to 10%" is intended to have the term "about" modifying both the 1% and the 10% endpoints. Further, it is understood that when an amount of a component is given, it is intended to signify the amount of the active material unless otherwise specifically stated. As used herein, all ranges provided are meant to include every specific range within, and combination of subranges between, the given ranges. Thus, a range from 1-5, includes specifically 1, 2, 3, 4 and 5, as well as subranges such as and 2-5, 3-5, 2-3, 2-4, 1-4, etc. As used herein a range of ratios is meant to include every specific ratio within, and combination of subranges between the given ranges.

Notwithstanding that the numerical ranges and parameters setting forth the broad scope of the disclosure are approximations, unless otherwise indicated the numerical values set forth in the specific examples are reported as precisely as possible. Any numerical value, however, inherently contains certain errors necessarily resulting from the standard deviation found in their respective testing measurements. The example that follows serves to illustrate embodiments of the present disclosure without, however, being limiting in nature.

As used herein, the terms "substantially free" or "essentially free" or "excluded" as used herein mean the specific material may be present in small amounts that do not materially affect the basic and novel characteristics of the embodiments of the micellar cleansing composition according to the disclosure or the material may be absent. For instance, there may be less than 2% by weight of a specific material added to a composition, based on the total weight of the micellar cleansing compositions (provided that an amount of less than 2% by weight does not materially affect the basic and novel characteristics of embodiments of the micellar cleansing composition according to the disclosure. Similarly, the micellar cleansing compositions may include less than 2%, less than 1.5%, less than 1%, less than 0.5%, less than 0.1%, less than 0.05%, or less than 0.01%, or none (0%) of the specified material. Furthermore, all components that are positively set forth in the instant disclosure may be negatively excluded from the claims, e.g., a claimed composition may be "free," "essentially free" (or "substantially free") of one or more components that are positively set forth in the instant disclosure. The term "substantially free" or "essentially free" as used herein may also mean that the specific material is not added to the micellar cleansing composition but may still be present in a raw material that is included in the micellar cleansing composition.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

The invention claimed is:

1. A monophasic micellar cleansing composition comprising:

(a) at least one biosurfactant present in an amount that is at least about 0.1%, by weight, based on the weight of the micellar cleansing composition;

(b) at least one polyglycerol ester surfactant present in an amount that is at least about 0.1%, by weight, based on the weight of the micellar cleansing composition; and (c) an aqueous carrier comprising at least water, wherein the micellar cleansing composition has a pH in a range from about 5 to about 8; and wherein the micellar cleansing composition is free of conditioning agents, is free of peptide polymers, or is free of both conditioning agents and peptide polymers.

2. The micellar cleansing composition according to claim 1, wherein the micellar cleansing composition is free of one or more ingredients selected from the group consisting of cationic polymers, polyethylene glycol/polyethylene oxide surfactants, fragrance and oil, and combinations thereof.

3. The micellar cleansing composition according to claim 1, wherein the at least one biosurfactant is selected from the group consisting of rhamnolipid, sophorolipid, spiculisporic acid, sodium surfactin, and combinations thereof.

4. The micellar cleansing composition according to claim 1, wherein the at least one biosurfactant is selected from the group consisting of rhamnolipid, sophorolipid, spiculisporic acid, sodium surfactin, and combinations thereof, and wherein if the biosurfactant is a sophorolipid the micellar cleansing composition has a pH that is at least 5, and if the biosurfactant is a rhamnolipid or spiculisporic acid the micellar cleansing composition has a pH that is at least 5.5, and if the biosurfactant is sodium surfactin the micellar cleansing composition has a pH that is at least 7.5.

5. The micellar cleansing composition according to claim 1, wherein the at least one polyglycerol ester surfactant is selected from the group consisting of at least one polyglycerol-3 ester surfactant, at least one polyglycerol-4 ester surfactant, and combinations thereof.

6. The micellar cleansing composition according to claim 1, wherein the at least one polyglycerol ester surfactant is selected from the group consisting of polyglyceryl-3 caprate, polyglyceryl-3 caprylate/caprate, polyglyceryl-3 laurate, polyglyceryl-4 caprate, polyglyceryl-4 laurate, polyglyceryl-4 caprylate/caprate, and combinations thereof.

7. The micellar cleansing composition according to claim 1, wherein the micellar cleansing composition expressly excludes any polyglycerol ester surfactants selected from the group consisting of Polyglyceryl-6/Polyglyceryl-4 Caprylate, Polyglyceryl-3 Caprylate, Polyglyceryl-3/Polyglyceryl-4 Caprylate, Polyglyceryl-6 Caprylate/Ricinoleate, Polyglyceryl-5 Laurate, Polyglyceryl-2 Laurate, Polyglyceryl-6 Dicaprate, Polyglyceryl-6 Caprylate, and combinations thereof.

8. The micellar cleansing composition according to claim 1, wherein the micellar cleansing composition expressly excludes surfactants and emulsifiers other than polyglycerol-3 ester surfactants and polyglycerol-4 ester surfactants, and oils other than tocopherol.

9. The micellar cleansing composition according to claim 1, wherein the at least one biosurfactant is present from at least about 0.1% to about 20%, by weight, based on the weight of the micellar cleansing composition.

10. The micellar cleansing composition according to claim 1, wherein the at least one biosurfactant is present from at least about 0.1% to about 4%, by weight, based on the weight of the micellar cleansing composition.

11. The micellar cleansing composition according to claim 1, wherein the at least one biosurfactant is present in the micellar cleansing composition at about 0.5% by weight, based on the weight of the micellar cleansing composition.

12. The micellar cleansing composition according to claim 1, wherein the at least one polyglycerol ester surfactant is present in the micellar cleansing composition from at least about 0.1% to about 5%, by weight, based on the weight of the micellar cleansing composition.

13. The micellar cleansing composition according to claim 1, wherein the at least one polyglycerol ester surfactant comprises one of polyglyceryl-3 caprylate/caprate or polyglyceryl-4 caprate present in the micellar cleansing composition from about 0.1% to about 0.8%, by weight, based on the weight of the micellar cleansing composition.

14. The micellar cleansing composition according to claim 1, wherein the at least one polyglycerol ester surfactant comprises one of polyglyceryl-3 caprylate/caprate or polyglyceryl-4 caprate present in the micellar cleansing composition at about 0.5%, by weight, based on the weight of the micellar cleansing composition.

15. The micellar cleansing composition according to claim 1, wherein water is present from about 85% to about 95%, by weight, based on the weight of the micellar cleansing composition.

16. The micellar cleansing composition according to claim 1, further comprising at least one water-based solvent selected from the group consisting of hexylene glycol, glycerin, pentylene glycol, propanediol, ethanol, propanol, butanol, isopropanol, isobutanol, benzyl alcohol, phenylethyl alcohol, and combinations thereof.

17. A micellar cleansing composition comprising:

at least one biosurfactant present from at least about 0.1% to about 1% and selected from the group consisting of rhamnolipid, sophorolipid, spiculisporic acid, sodium surfactin, and combinations thereof;

at least one polyglycerol ester surfactant present from at least about 0.1% to about 1% and selected from the group consisting of at least one polyglycerol-3 ester surfactant and at least one polyglycerol-4 ester surfactant;

water present from about 85% to about 95%; and at least one water-based solvent comprising hexylene glycol, glycerin or a combination thereof, each present from about 0.5% to about 5%, all amounts by weight, based on the weight of the micellar cleansing composition.

18. The micellar cleansing composition according to claim 17, wherein the micellar cleansing composition expressly excludes surfactants other than the at least one polyglycerol-3 ester surfactant and the at least one polyglycerol-4 ester surfactant, emulsifiers, and oils other than tocopherol.

19. The micellar cleansing composition according to claim 17, wherein the at least one biosurfactant is selected from the group consisting of rhamnolipid, sophorolipid, spiculisporic acid, and sodium surfactin, wherein if the biosurfactant is a sophorolipid the micellar cleansing composition has a pH that is at least 5, and if the biosurfactant is a rhamnolipid or spiculisporic acid the micellar cleansing composition has a pH that is at least 5.5, and if the biosurfactant is sodium surfactin the micellar cleansing composition has a pH that is at least 7.5.

20. A micellar cleansing composition comprising:

at least one biosurfactant present at about 0.5% and selected from the group consisting of rhamnolipid, sophorolipid, spiculisporic acid, sodium surfactin, and combinations thereof;

at least one polyglycerol ester surfactant present at about 0.5%, wherein the at least one polyglycerol ester surfactant is selected from the group consisting of at least one polyglycerol-3 ester surfactant, at least one polyglycerol-4 ester surfactant, and combinations thereof;

water present at about 95%; and at least one water-based solvent comprising hexylene glycol, glycerin or a combination thereof, each present from about 1% to about 2%, all amounts by weight, based on the weight of the micellar cleansing composition, wherein if the biosurfactant is a sophorolipid, the micellar cleansing composition has a pH that is at least 5, and wherein if the biosurfactant is a rhamnolipid or spiculisporic acid, the micellar cleansing composition has a pH that is at least 5.5, and wherein if the biosurfactant is sodium surfactin, the micellar cleansing composition has a pH that is at least 7.5.

* * * * *